United States Patent Office 3,481,020
Patented Dec. 2, 1969

3,481,020
METHOD FOR RECLAIMING COMPOSITE METAL SCRAP
Joseph Winter and Alan J. Goldman, New Haven, Conn., assignors to Olin Mathieson Chemical Corporation, a corporation of Virginia
Filed Feb. 28, 1967, Ser. No. 619,334
Int. Cl. C22b 7/00
U.S. Cl. 29—403    8 Claims

ABSTRACT OF THE DISCLOSURE

This invention is a method of separating composites made of different metals and/or alloys by weakening the bond between the dissimilar metals in the composite by void formation at the bond interface, and/or grain boundary rupture in the vicinity of the bond interface, and/or formation of a brittle intermetallic phase at the bond interface.

---

Figure 1:
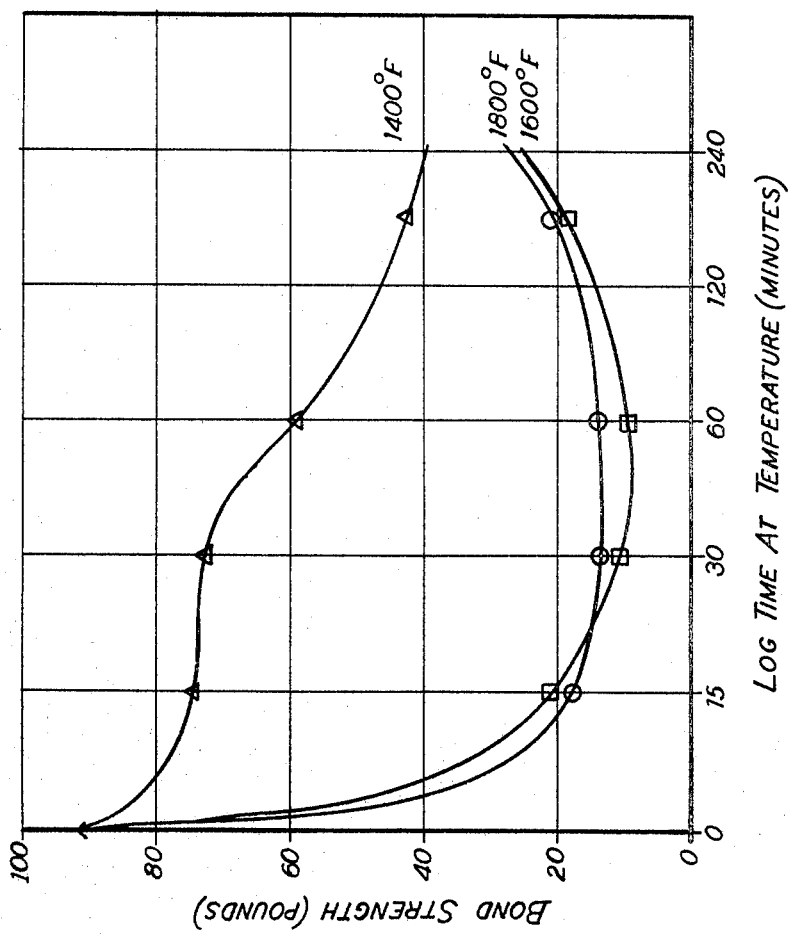

This invention relates to the separation of dissimilar metals and alloys from composites of such metals and alloys by heat treatment and subsequent mechanical separation.

Large volumes of scrap from composites of metals are obtained both during the production of the composite metals and during the production of articles from the composites.

One method of separating the dissimilar metals is to melt the composite down in furnaces requiring large outlays for melting furnaces, for heat and/or electricity, for furnace linings and for casting equipment. Not only is this method not satisfactory from a standpoint of economics, but also where such melt down operations are not commonly carried out, it requires entering into an entirely new technological area. Furthermore, melting down some composites results in alloys which have no commercial use, for example, copper-iron alloys and aluminum-iron alloys. The pure metals in such alloys must be separated from the alloy, for instance, by volatilization of the more volatile metal, or by selective leaching in a second step.

Therefore, it is an object of the present invention to separate dissimilar metals from scrap composites containing the same which is less expensive than previous methods.

It is also an object of the present invention to avoid the necessary processing equipment and difficult processing techniques encountered with the melt separation method of the prior art.

It is also an object of the present invention to avoid the production of alloys having no commercial use which require subsequent processing steps for commercial use.

In general, it has been found that in composites formed of dissimilar metals, the bond between the two metals can be weakened due to one or more of the following mechanisms:

(1) The formation of voids which migrate to the dissimilar metal interface.

(2) The formation of at least one brittle, intermetallic phase at the dissimilar metal interface, and (3) In hydrogen containing atmospheres, the formation of $H_2O$ vapor which causes grain boundary rupture in the area near the dissimilar metal interface.

The composites to be treated according to the present invention may contain two or more layers of dissimilar metals or alloys. The invention is in no way limited by the number of layers encountered. Furthermore, the layers may be on more than one side of the composite or on all sides of the composite.

There is also no limitation as to the type of bond holding the metallic layers in the composite. The bond can be either a diffusion or metallurgical bond, or a mechanical bond.

One embodiment of the present invention relates to the U.S. Mint composite for dimes and quarters made of cupro-nickel (75% copper, 25% nickel) and copper (tough pitch copper). The tough pitch copper contains approximately .04% oxygen, mostly as copper oxide. The mint composite consists of layers of cupro-nickel (0.010″) on either side of a tough pitch copper core (0.032″) for quarter stock, and (0.007″ layers on an 0.027″ core for dime stock.

This composite can be separated by heating the composite to a temperature of from 1600 to 1800° F. for a time between 20 minutes and three hours in an inert atmosphere, followed by mechanical separation of the cupro-nickel layer or layers from the copper by breaking the weakened cupro-nickel/copper bond.

It is necessary to use an inert or slightly reducing atmosphere because if the atmosphere contains a significant amount of oxygen, the cupro-nickel layer is oxidized at these temperatures.

Figure 2:
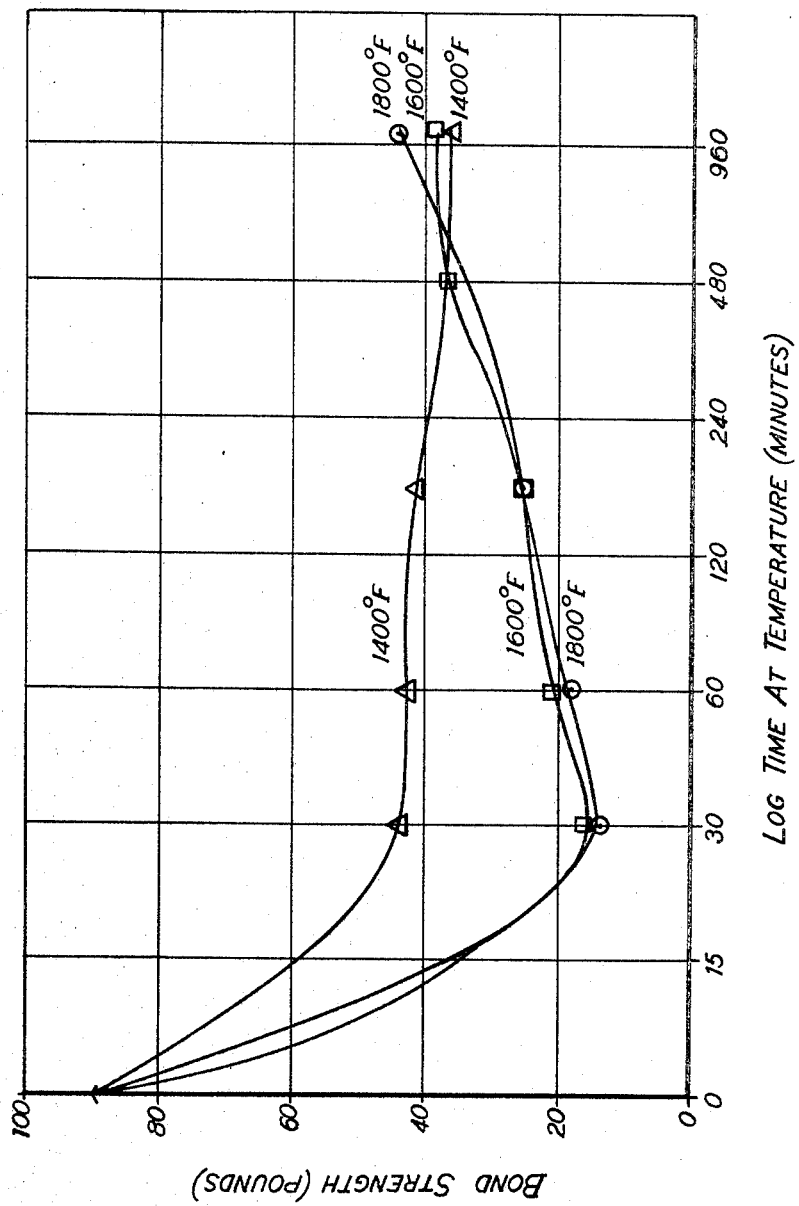

FIGURE 1 is a plot of log time at temperature v. bond strength in pounds for the above-described mint composite with layers of cupro-nickel on either side of the copper core. The bond strength is determined by measuring the force required to peel the cladding from a ¾″ wide sample in a tensile testing machine at a crosshead speed of 0.2 in./minute. When peeling force of less than 20 lbs. is observed by this test method, composites may be separated by hand without the use of mechanical devices. FIGURE 2 illustrates the same relationship for a composite which has been cold rolled approximately 20%.

It can be seen from both curves that there is a decrease in bond strength with increase in time at the indicated heating temperatures.

It is believed that the following explanation accounts for the observed results.

During the heating period, the copper atoms diffuse into the cupro-nickel faster than the nickel atoms diffuse into the copper. As a result of this difference in diffusion rates, there is vacancy diffusion from the cupro-nickel side of the composite into the core. As the number of vacancies in the core increases, these vacancies coalesce to form voids. The formation of these voids constitutes the first mechanism whereby, the bond strength is reduced when heated at the indicated times and temperatures.

Secondly, free energy data shows that NiO is more stable than $Cu_2O$. The oxygen content is present in the copper according to the following equilibrium.

$2Cu_2O \rightleftarrows 4Cu + O_2$. As a result of this reaction and the greater stability of NiO, there is a dissociation of $Cu_2O$ and diffusion of oxygen to the interface and a short distance into the cupro-nickel layer where it reacts with the nickel therein to form NiO.

The NiO which is formed in the cupro-nickel side then acts as a nucleating site for the formation of voids in the cupro-nickel layer. This provides the second reason for the decrease in bond strength shown in FIGURES 1 and 2.

It can be seen from FIGURES 1 and 2 that an increase in bond strength is observed after heating for three hours at 1600° F. and 1800° F.

Experimental evidence indicates that the atomic vacancies which form the voids in a cupro-nickel clad begin to diffuse along the grain boundaries to a free surface. Thus, the bond weakening due to voids is reduced. This takes place to lesser extent in the copper core because of the very large grain growth which has taken place in the core during the heating treatment. Furthermore, the nickel which has diffused into the copper results in solid solution hardening of the copper. Also, grains have now formed across the interface uniting the two sides of the clad.

The criticality of the use of a minimum temperature of 1600° F. may be seen from FIGURES 1 and 2 of the drawings which show that in a case of treatments at 1600 and 1800° F., a very clear minimum in peeling strength of below 20 pounds is reached, not only in the uncold-worked materials tabulated in FIGURE 1, but also in the cold-worked materials of FIGURE 2. However, this minimum is not obtained by heating at 1400° F. in either figure. In all cases, the bond strength remains above about 35 pounds at 1400° F. Since about 20 pounds is the level at which either hand peeling or continuous mechanical separation can take place, it is seen that operation at 1400° F. does not result in a bond strength low enough for effective separation.

As indicated above, at 1600° F. and 1800° F., times longer than three hours show an increase above the 20 pound level so that the indicated maximum of three hours heating time must be observed. It is also apparent that at least 20 minutes at these temperatures is required to lower the bond strength to 20 pounds or lower.

This method is acceptable for not only 2 or 3-layer composites, but for multi-layer composites as well.

Many other composites can also be separated on the basis of this vacancy diffusion method. For example, copper or brass clad on stainless steel, either the Cr containing type (i.e., 409) or the Cr-Ni containing type (i.e., 18–8) can be so separated. Also, iron alloys containing, for instance, Ni and Co (i.e., Invar 29% Ni, 17% Co) clad on copper or copper alloys can be separated by this method.

It is also to be emphasized that many alloy systems, for example, Al-Zn and Fe-Cu which cannot be separated on the basis of the hereinafter described brittle intermetallic phase formation because no intermetallic phases are formed in these systems, can be separated by the void formation technique.

The previously mentioned cupro-nickel/copper composite, in addition to having the bond strength decreased by the previously described mechanism, can also be subjected to a bond weakening process based on hydrogen embrittlement. However, it is to be emphasized that it is not at all necessary or essential that the void formation separation technique be combined with the hydrogen embrittlement technique.

At temperatures above 1250° F. in atmospheres containing more than 2% $H_2$, hydrogen diffuses interstitially very rapidly in both the cupro-nickel layers and in the copper layer. Thus, it does not take longer than 15 minutes at these temperatures for the hydrogen to diffuse through an 0.007 inch cupro-nickel layer into the tough pitch copper core. The core contains oxygen as $Cu_2O$ and also some oxygen in solid solution in the copper. The hydrogen reduces the copper oxide to form $H_2O$ and also forms $H_2O$ by reaction with the oxygen in solid solution in the copper. The steam occupies a much larger volume than the hydrogen molecules and readily causes grain boundary rupture in the copper in and around the interface.

The previously described void formation aids the hydrogen in its diffusion path, and the two inter-react together in embrittle the area around the interface very rapidly. Thus, much less time than 20 minutes (i.e., 1–5 minutes) is required if the heating is done in a hydrogen atmosphere in order to obtain a peel strength below 20 pounds at 1600 to 1800° F.

A large quantity of hydrogen in the atmosphere is not necessary. Very effective hydrogen embrittlement can be achieved, for example, with only 2% by volume of $H_2$ at temperatures above 1250° F. if times in excess of 15 minutes are used. A 7.2% hydrogen atmosphere has also been successfully tested.

Furthermore, the use of hydrogen in the atmosphere enables the temperature to be lowered for the heating treatment. For instance, temperatures of 1200° F. and times for one hour can be utilized, since the combined void formation and hydrogen embrittlement inter-react effectively.

The hydrogen embrittlement technique is not limited to separating the mint composite. This technique can be utilized to separate any composite containing copper or another metal which has an oxygen content greater than 0.01% as the core. It will be apparent that the only requirement is the 0.01% oxygen content in one metal and sufficient diffusion time at temperature for the hydrogen to reach the oxygen in the metal in the vicinity of the interface. Experience has shown that the dissimilar metal interface is more subject to hydrogen embrittlement than the rest of the metal layer, for reasons yet not clear.

Since hydrogen diffuses interstitially, a temperature of 1600° F. with appropriate times (1 minute to 1 hour) should be sufficient for practically all dissimilar alloy systems in which one of the dissimilar metal or alloys contains oxygen.

As mentioned previously, it is also possible to separate dissimilar metals from a composite by the formation of a brittle phase.

For example, in the case of a composite made up of a copper alloy and an aluminum alloy, if the composite is heated to a temperature above 500° F. for at least one hour and at progressively lower times at higher temperatures (only 10 minutes are required at 900° F.), one or more brittle phases will form at the copper alloy-aluminum alloy interface.

On the aluminum side of the composite, $CuAl_2$ a moderately hard and a very brittle, complex tetragonal phase will form as soon as the solubility of copper in aluminum is exceeded which is, for example, 3.5% at about 900° F., and varies somewhat depending upon the particular aluminum alloy used in the composite.

On the copper side of the composite, as soon as approximately 9.5% aluminum has diffused in, $\sigma_2$, also a brittle, intermetallic compound, will form at temperatures below about 1050° F. In fact, with sufficient time at temperature, all the intermetallic compounds which can be formed according to the equilibrium diagram between copper and aluminum will form. For example, after heating a copper-aluminum composite for one hour at 900° F., five intermetallic layers have been observed.

One composite which can be separated by the formation of a brittle, intermetallic phase, the aluminum-brass composite, is particularly interesting. An intermetallic phase which can form with aluminum-brass composite, of course, is the $CuAl_2$ phase, described above. In addition, from studies of photomicrographs, other more complicated phases involving zinc are known to exist. However, so far these phases have not been clearly identified. Less times and/or lower temperatures can be utilized for aluminum-brass composites than for previously described aluminum-copper alloys. For example, the same times can be utilized at a temperature 100° F. lower. Copper-zinc composites can also be separated by treating at temperatures from 500 to 750° F. for a period of 15 minutes to 3 hours.

The aluminum-iron composite can also be separated due to the formation of phases, one of which has been identified by X-ray diffraction as $Fe_2Al_5$. The amount of iron necessary to diffuse into the aluminum in this case is very small, much less than 1% being required. Temperatures from 600 to 1100° F. can be utilized for this treatment at times from 15 minutes at the higher range to three hours at the lower temperatures.

It is to be emphasized, however, that not all dissimilar metal composites can be separated according to this procedure. There must be a brittle, intermetallic phase formed. For example, a silver-aluminum composite could not be separated on this basis because the intermetallic phase formed is not brittle. Furthermore, systems such as silver-gold which form no intermetallic phases obviously cannot be separated by this method.

The time at temperature must be long enough for the zone of intermetallic compounds to grow to a sufficient width (i.e., for Cu-Al composites $5 \times 10^{-4}$ cm.) so that when the intermetallic compound forms, there is a sufficiently large distance between the copper and aluminum layers so that significant re-welding or re-bonding cannot take place. For this reason, the higher temperatures are recommended if short processing times are desired.

Again, hydrogen may be utilized to aid the bond deterioration whenever the core metal or alloy in the composite contains some oxygen. If a hydrogen containing atmosphere is utilized, steam will form and grain boundary rupture will take place near the dissimilar metal interface.

In general, if hydrogen embrittlement is to be utilized in conjunction with intermetallic phase bond deterioration, temperatures in the range of 1250° F. and times for at least one minute should be utilized to give the hydrogen an opportunity to diffuse to the dissimilar metal interface.

Those skilled in the art can readily determine the required times, hydrogen contents, and temperatures which will give the minimum time at temperature required to obtain a peel strength of below 20 pounds, which is necessary for efficient peeling, according to the previously described test.

In those alloy systems in which oxidation of the metal is not a problem at elevated temperature, the heating does not have to be done in a non-oxidizing atmosphere. For example, if the outer layer of a composite were made of gold, an oxidizing atmosphere could be utilized.

It is to be understood that the mechanical separating step may be done either by hand, or preferably, in industrial operation, it can be done continuously.

For example, if a composite is in sheet form, the sheet can be placed upon a roll and unwound, passed through a heating furnace for the required time at the required temperature to reduce the bond strength and then the mechanical separation process can take place continuously. The separated sheets could be then wound up on rolls, or be recovered in any other convenient manner.

It is to be understood that the invention is not limited to the illustrations described and shown herein which are deemed to be merely illustrative of the best modes of carrying out of the invention, and which are susceptible of modifications of form, size, arrangement of parts and detail of operation, but rather is intended to encompass all such modifications which are within the spirit and scope of the invention as set forth in the appended claims.

What is claimed is:

1. A process for recovering scrap from dissimilar metal composites having an interface bond, the components of said composite being selected from the group consisting of iron, copper, and base alloys thereof, comprising heating the metallic composite to an elevated temperature and for a time sufficient to effect diffusion of at least two dissimilar metals into each other from opposite sides of the dissimilar metal interface in the composite and thereby form voids, thereby weakening the bond to a level at which it can be readily separated, and mechanically separating the two dissimilar metals by breaking the weakened composite bond.

2. A process according to claim 1 in which the heat- is done in an inert atmosphere.

3. A process according to claim 1 in which a cupro-nickel/copper composite is separated into copper and cupro-nickel alloy.

4. A process according to claim 2 in which the composite treated is a core of copper clad on two sides with cupro-nickel.

5. A process according to claim 1 in which the bond strength is reduced to below approximately 20 pounds if detemined by measuring the force required to peel the cladding from a ¾″ wide sample in a tensile testing machine at a crosshead speed of 0.2 in./minute before mechanical separation.

6. A process according to claim 3 in which the heating is done at a temperature of from about 1600° F. to about 1800° F. for a time from about 20 minutes to about three hours.

7. A process according to claim 1 in which the clad is selected from the group consisting of copper and copper alloys, and the core is an iron containing alloy.

8. A process according to claim 1 which is carried out continuously.

References Cited
UNITED STATES PATENTS

| | | | |
|---|---|---|---|
| 2,438,759 | 3/1948 | Liebowitz | 29—472.3 |
| 2,458,908 | 1/1949 | Jacobs | 29—426 X |
| 2,747,265 | 5/1956 | Boessenkool | 29—403 |
| 2,753,623 | 7/1956 | Boessenkool et al. | 29—497.5 |
| 3,068,564 | 12/1962 | Wiedt | 29—472.3 X |
| 3,083,451 | 4/1963 | Atkinson | 29—497 X |

JOHN F. CAMPBELL, Primary Examiner

D. C. REILEY, Assistant Examiner

U.S. Cl. X.R.

29—426; 75—63; 148—127